Oct. 13, 1964   L. J. CRAVENER   3,152,353
LAWN APPLICATION FOR FERTILIZER AND THE LIKE
Filed Aug. 31, 1962
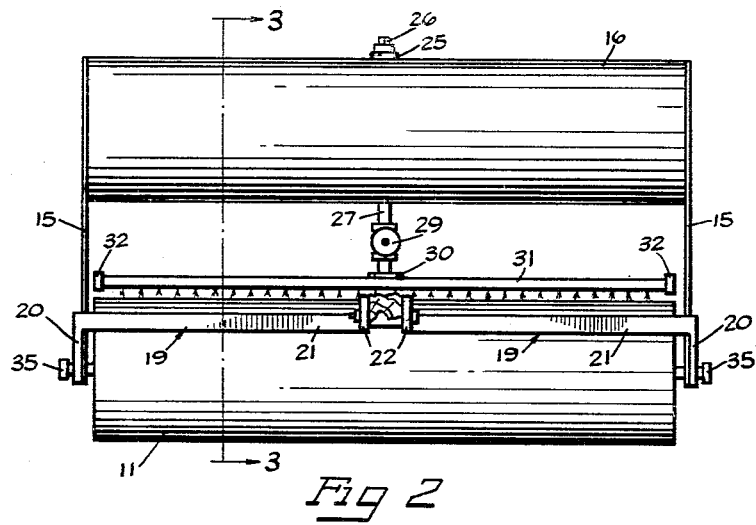
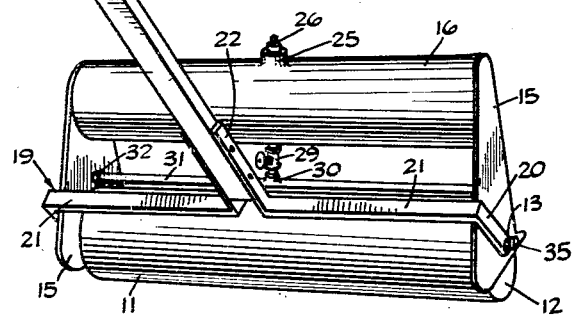
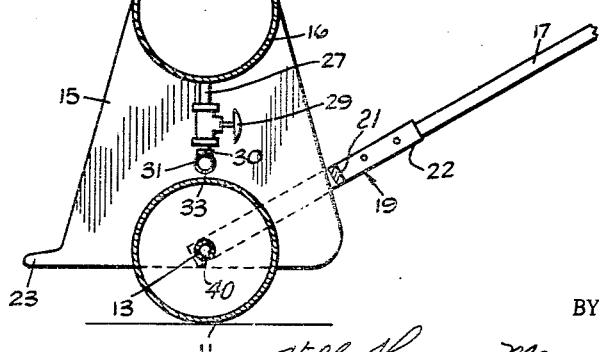
INVENTOR.
Leon J. Cravener
BY
ATTORNEYS

United States Patent Office 3,152,353
Patented Oct. 13, 1964

3,152,353
LAWN APPLICATOR FOR FERTILIZER AND THE LIKE
Leon J. Cravener, Grant Park, Ill.
Filed Aug. 31, 1962, Ser. No. 220,825
2 Claims. (Cl. 15—575)

This invention relates to improvements in lawn treating devices and more particularly relates to such devices adapted to apply liquid weed killers and fertilizers directly to the lawn.

A principal object of the invention is to provide a simple form of device for applying liquid weed killers and fertilizers to a lawn, avoiding drift of the liquid by the wind or force of a spray when applying liquid to the lawn.

A further object of the invention is to improve upon the applicators for liquid weed killers and fertilizers heretofore in use by wetting the surface of a roller with the weed killer or applicator and moving the wetted roller along the ground.

A further object of the invention is to provide a novel and improved lawn treating device for applying liquid weed killers and fertilizers to the ground which may safely be used on windy days without the danger of affecting other plants in the garden.

A still further object of the invention is to provide a roller and vertically spaced tank for applying liquid weed killers or fertilizers to lawns in which the tank is spaced above the roller to feed liquid weed killer or fertilizer along the face of the roller and in which the frame structure forming bearing mountings for the roller also supports and closes opposite ends of the tank.

These and other objects of the invention will appear from time to time as the following specification proceeds and with reference to the accompanying drawing wherein:

FIGURE 1 is a perspective view of a lawn treating device constructed in accordance with the principles of the invention;

FIGURE 2 is a view in side elevation of the device shown in FIGURE 1 with the handle broken away; and FIGURE 3 is a transverse sectional view taken substantially along line 3—3 of FIGURE 2.

In the embodiment of the invention illustrated in the drawings, I have shown a lawn treating device consisting of a roller 11 adapted to apply liquid weed killer or fertilizer to the surface of the lawn and having opposite closed ends 12, 12 having an axle 13 extending along the center thereof and projecting beyond opposite ends thereof and forming a pivotal mounting for end plates 15, 15 closing opposite ends of a supply tank 16 for liquid weed killers or fertilizers.

The end plates 16 are generally triangular in side elevation and conform at their upper ends to the contour of the tank 16 and may be welded thereto to close opposite ends of said tank and support said tank above the roller 11 in vertical alignment therewith.

The shaft 13 also forms a mounting at its opposite ends for a handle 17. As shown in FIGURES 1, 2 and 3, the handle 17 is pivotally mounted on opposite ends of the shaft 13 by bracket members 19 having inwardly extending legs 20 extending along the outer sides of the plates 15 and mounted at their ends on the shaft 13. The bracket members 19 also have arms 21 extending from the legs 20 toward the center of the roller 11 and having right angled outwardly extending arm portions 22 secured to the handle 17 as by nuts and bolts in a conventional manner.

It may be seen from FIGURES 1, 2 and 3, that the arms 21 come into engagement with the back edges of the plates 15 and thereby pivot the plates 15 and tank 16 upwardly about the axis of the shaft 13 when the handle 17 is lifted from the ground, and retain the plates 15 and storage tank 16 in vertically spaced relation with respect to the roller 11 during use of said roller and the pushing of said roller along the ground by the handle 17. The plates 15 have forwardly projecting lower end portions 23 forming stops to limit tilting movement of the plates 15 and tank 16 in a forward direction about the axle 13 in cases where the hand is removed from the handle 17 and due to the ground contour the tank 16 may tend to tilt about the axle 13 away from the handle 17. The handle 17 may thus pivot freely about the axle 13 and the stop portions 23 of the plates 15 may support the tank 16 in the generally upright position when the handle is lowered into engagement with the ground.

The tank 16 has an upwardly extending inlet 25, accommodating said tank to be filled with liquid fertilizer and the like. The inlet 25 may be closed by a suitable closure device such as a pipe plug 26 after the tank has been filled with liquid weed killer or fertilizer.

The tank 16 also has a pipe 27 leading from the bottom thereof at the transverse center thereof and connected with a shut-off valve 29.

The shut-off valve 29 has connection with an inlet 30 to a transverse pipe 31. The inlet 30 extends upwardly from the pipe 31 and the pipe 31 is supported on said inlet to extend along the top of the roller 11 in vertically spaced relation with respect thereto.

The pipe 31 is closed at its opposite ends by end caps 32 and has a series of orifices or nozzle openings 33 opening through the bottom thereof for the length thereof for supplying liquid fertilizer to the face of the roller 11. The nozzle openings 33 may be formed by drilling a series of small holes through the pipe.

When it is desired to treat a lawn with weed killer, the pipe plug 26 may be removed and the required amount of 2–4–D or any other desired weed killer may be placed in said tank. The tank 16 may then be filled with water with a garden hose and the handle 17 may be moved up and down a few times to insure a good mix. The valve 29 may then be turned on to distribute liquid weed killer to the pipe 31 and to accommodate the liquid weed killer to flow out through the nozzle openings 33 by gravity onto the face of the roller 11 as the roller is rolled over the ground.

It may here be seen that since the weed killer is applied directly to the ground by rolling the roller 11 along the ground that there is no danger of the wind blowing the weed killer on the flower beds as prevalent when applying liquid weed killer by a spray and the like.

It may further be seen that the weed killer may be applied close to other plantings and that the roller not only wets the weeds, but presses the herbicide into the leaves of the weeds.

On finishing the application of weed killer or liquid fertilizer to the lawn, the tank may be rinsed with a detergent and then emptied by opening the valve 29.

The axle shaft 13 is shown in FIGURE 3 as being hollow and has communication with the interior of the roller 11 through a downwardly opening port 40 opening through said axle shaft. The open ends of the shaft 13 may be closed by caps 35 either one of which may be unscrewed to accommodate the roller 11 to be filled with water and used as a lawn roller when desired, either while killing weeds or fertilizing, or as a separate rolling operation.

While I have herein shown and described one form in which my invention may be embodied, it may readily be understood that various variations and modifications in the invention may be attained without departing from the spirit and scope of the novel concepts thereof as defined by the claims appended hereto.

I claim as my invention:

1. A lawn treating device comprising:
   a roller,
   a concentric axle for said roller extending beyond opposite ends thereof,
   a frame comprising spaced side plates pivotally mounted on said axle and extending upwardly therefrom along the outside of said roller,
   a tank connecting said side plates together and closed at its opposite ends by said side plates,
   an inlet to said tank opening to said tank through the top thereof,
   an outlet from the bottom of said tank having a valve connected thereto,
   a pipe connected to said valve, intermediate its ends, and closed at its opposite ends and extending parallel to the face of said roller and having a plurality of nozzle openings therein opening to said roller,
   spaced bracket members mounted on the outer end portions of said axle for movement about said axle and having inwardly directed portions adapted to abut the rear edges of said side plates in the operating position of the device, and
   a rearwardly directed handle member connected to said inwardly directed portions of said bracket members,
   said side plates having forwardly projecting lower stop portions engageable with the ground when the device is in an inoperative position, and said handle member and bracket member retaining said side plates and tank in upstanding relation with respect to said roller and positioning said tank above said roller to supply lawn treating liquid to said pipe for discharge onto the face of said roller by gravity.

2. A lawn treating device comprising:
   a roller,
   a concentric axle for said roller extending beyond opposite ends thereof,
   a frame comprising spaced side plates pivotally mounted on said axle and extending upwardly therefrom along the outside of said roller,
   a tank connecting said side plates together and closed at its opposite ends of said side plates,
   an inlet to said tank opening to said tank through the top thereof,
   an outlet from the bottom of said tank having a valve connected thereto,
   a pipe connected to said valve intermediate its ends and closed at its opposite ends and extending parallel to the face of said roller and having a plurality of nozzle openings therein opening to said roller,
   spaced bracket members mounted on said handle adjacent opposite ends thereof for movement thereabout and having inwardly directed portions adapted to abut the rear edges of said side plates in the operating position of the device, and
   a handle member connected to said inwardly directed portions of said bracket members and extending therefrom,
   said bracket members retaining said side plates and tank in upstanding relation with respect to said roller and positioning said tank above said roller to supply lawn treating liquid to said pipe for discharge onto the face of said roller by gravity,
   said axle being hollow and having communication with the interior of said roller, and
   caps closing opposite ends of said axle,
   one of said caps being removable to accommodate the filling of said roller with water.

References Cited in the file of this patent

UNITED STATES PATENTS

| | | |
|---|---|---|
| 588,445 | King | Aug. 17, 1897 |
| 953,771 | Wilder | Apr. 5, 1910 |
| 2,072,331 | Hanna | Mar. 2, 1937 |
| 2,221,764 | Graham | Nov. 19, 1940 |

FOREIGN PATENTS

| | | |
|---|---|---|
| 338,163 | Great Britain | Nov. 12, 1930 |
| 849,740 | Great Britain | Sept. 28, 1960 |